(12) United States Patent
Mirel et al.

(10) Patent No.: US 12,498,264 B2
(45) Date of Patent: Dec. 16, 2025

(54) COMPENSATION FOR CROSSTALK BETWEEN ELECTRONIC DISPLAY AND AMBIENT LIGHT SENSOR

(71) Applicant: Apple Inc., Cupertino, CA (US)

(72) Inventors: Ionut A Mirel, Cupertino, CA (US); Mahesh B Chappalli, San Jose, CA (US); Maximillian C Bruggeman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/537,783

(22) Filed: Dec. 12, 2023

(65) Prior Publication Data

US 2025/0109985 A1   Apr. 3, 2025

Related U.S. Application Data

(60) Provisional application No. 63/586,351, filed on Sep. 28, 2023.

(51) Int. Cl.
*G01J 1/42* (2006.01)

(52) U.S. Cl.
CPC ...... *G01J 1/4204* (2013.01); *G09G 2360/144* (2013.01); *G09G 2360/145* (2013.01); *G09G 2360/16* (2013.01)

(58) Field of Classification Search
CPC .... G01J 1/44; G01J 1/4204; G09G 2360/144; G09G 2320/0626; G09G 2360/145; G09G 2320/0693; G09G 2360/16
See application file for complete search history.

(56) References Cited

U.S. PATENT DOCUMENTS

| | | | |
|---|---|---|---|
| 10,267,677 B1 | 4/2019 | Sarkar et al. | |
| 10,404,935 B1* | 9/2019 | Peana | G09G 5/10 |
| 10,438,564 B2 | 10/2019 | Cote et al. | |
| 10,964,274 B2 | 3/2021 | Kang | |
| 11,087,677 B2 | 8/2021 | Wu et al. | |
| 11,145,249 B1 | 10/2021 | Han et al. | |
| 11,436,997 B2* | 9/2022 | Wu | G09G 5/10 |
| 2018/0075798 A1 | 3/2018 | Nho et al. | |
| 2022/0236110 A1 | 7/2022 | Archibald et al. | |
| 2023/0010162 A1* | 1/2023 | Choi | G09G 3/3208 |

(Continued)

FOREIGN PATENT DOCUMENTS

| | | |
|---|---|---|
| CN | 111486950 B | 4/2022 |
| CN | 116193268 A | 5/2023 |

(Continued)

OTHER PUBLICATIONS

U.S. Appl. No. 18/100,858, filed Jan. 24, 2023, Francesco LaRocca.

*Primary Examiner* — Georgia Y Epps
*Assistant Examiner* — Erin R Garber
(74) *Attorney, Agent, or Firm* — Fletcher Yoder, P.C.

(57) ABSTRACT

An electronic display includes an ambient light sensor (ALS) located beneath an active area to sense ambient light above the active area. The ALS is synchronized with blanking periods of a display pixel on the active area. An emission-off scale factor is calculated based on an emission profile of the display pixel when the display pixel is turned off. The emission-off scale factor is used with display content to calculate a crosstalk compensation for the ALS.

21 Claims, 11 Drawing Sheets

(56) References Cited

U.S. PATENT DOCUMENTS

| | | | | |
|---|---|---|---|---|
| 2023/0282153 A1* | 9/2023 | Thielemans | ............. | G09G 3/32 345/694 |
| 2023/0358603 A1* | 11/2023 | He | ........................ | G01J 1/4204 |
| 2024/0046835 A1* | 2/2024 | Zhang | ...................... | G09G 3/20 |

FOREIGN PATENT DOCUMENTS

| | | |
|---|---|---|
| DE | 112015003769 B4 | 3/2023 |
| WO | 2022055742 A1 | 3/2022 |

\* cited by examiner

COMPENSATION FOR CROSSTALK BETWEEN ELECTRONIC DISPLAY AND AMBIENT LIGHT SENSOR

CROSS-REFERENCE TO RELATED APPLICATIONS

This application claims priority to U.S. Application No. 63/586,351, filed Sep. 28, 2023, entitled "COMPENSATION FOR CROSSTALK BETWEEN ELECTRONIC DISPLAY AND AMBIENT LIGHT SENSOR," which is incorporated by reference in its entirety herein for all purposes.

BACKGROUND

The present disclosure relates generally to electronic displays and, more specifically, to applying crosstalk compensation to compensate for crosstalk occurring between an ambient light signal and other display signals.

Numerous electronic devices-such as cellular devices, televisions, handheld devices, and notebook computers-often display images and videos on an electronic display. Many electronic displays use an ambient light sensor (ALS) to identify the amount and/or color of ambient light. An ALS senses ambient light and allows the brightness and/or color of the electronic display to be adjusted. When the ALS is located near the display pixels of the electronic display, light emitted from the display itself may be detected by the ALS. The light emitted from the display is not ambient light and could cause the ALS to incorrectly measure the ambient light even when parts of the electronic display are not being actively controlled to emit light.

SUMMARY

A crosstalk compensation technique may compensate for crosstalk occurring between components of signal detected by the ALS due to ambient conditions and those due to light from display pixels, including display pixels that may be emitting residual light after an emission period. Additionally, the sensing and compensation may be used to accommodate display content that may rapidly change, environments that may rapidly change, or both. The current disclosure is related to implementing ambient light sensing integration during blanking periods of display emission of the display pixels to reduce the amount of display back-emission observed by the ALS substantially and thus reduce the display crosstalk. Fast sensing integration may be used to accommodate the rapidly changing dynamic image content displayed on the display. In addition, to support integration of the ALS measurements only during the rolling emission-off bands on the display panel, a respective emission-off (EM-off) scale factor that represents the duty-cycled emission of each pixel line of the display panel may be calculated based on transient behaviors of emission profile of the display pixels. The EM-off scale factor may be calculated for different pixel lines on the display panel for various gray levels and various brightness levels of the display panel. An EM-off scale factor for a certain brightness and gray level may be generated by interpolating calculated EM-off factor values. The EM-off scale factor may be used to compensate the measurement of the ALS.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
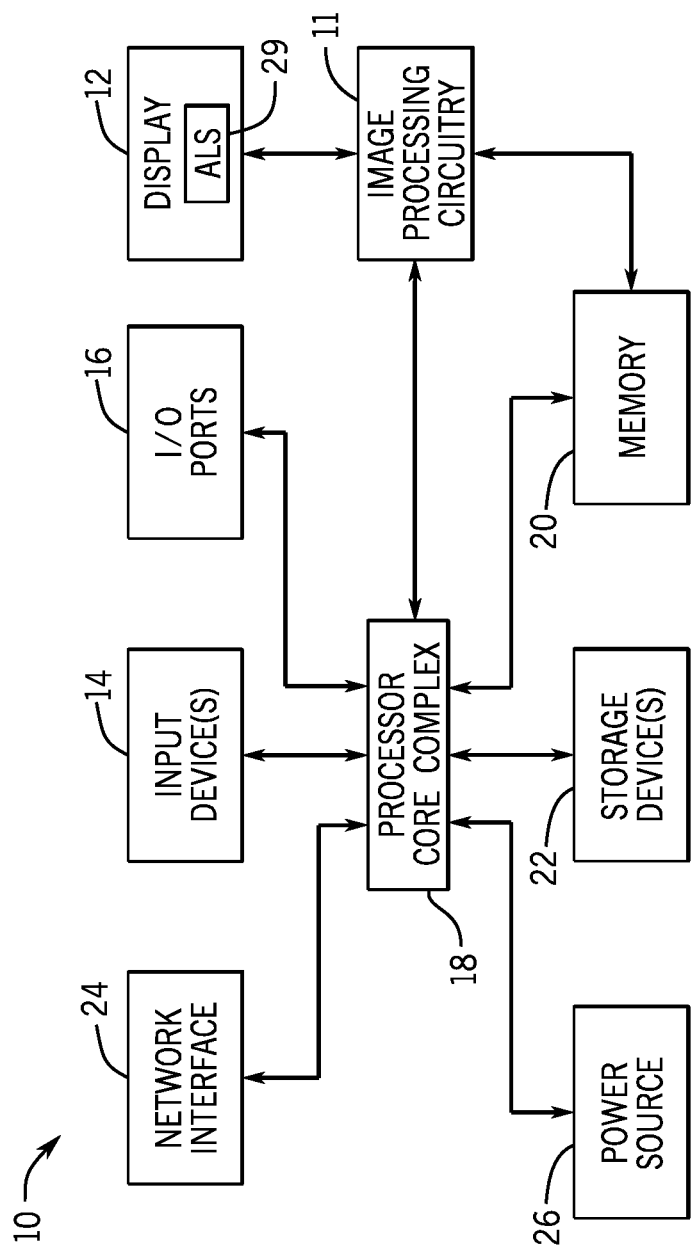
FIG. 1 is a block diagram of an electronic device, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment", "an embodiment", or "some embodiments" of the present disclosure are not intended to be interpreted as excluding the existence of additional embodiments that also incorporate the recited features. Use of the term "approximately" or "near" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

As previously mentioned, electronic devices may include multiple chips and devices, such as a display device to display image content (e.g., pictures, video, and so forth). The display may display the content in various light environments. The display device may include an ALS to provide a consistent viewing experience in different ambient lighting of the various environments. In particular, the ALS may sense ambient light. Based on the brightness and/or color of the ambient light, processing circuitry of the electronic device may adjust the display brightness and/or color of the image content to be displayed on the electronic display. In this way, the ALS may ensure that the content displayed on the display is visible in the various different lighting environments while reducing (e.g., optimizing) power consumption. Specifically, the ALS may sense lighting conditions of the environment to allow the color and/or brightness of the electronic display to be adjusted accordingly. However, ensuring that other display signals in the display do not interfere with ambient light signals to the ALS may be difficult.

The current disclosure is related to operating an ALS in a display of an electronic device so that it's sensing integrations only occur during blanking periods of display emission of the display pixels. Fast sensing integration may be used to accommodate the rapidly changing dynamic image content displayed on the display. In addition, to support integration of the ALS measurements only during the rolling emission-off bands on the display panel, a respective emission-off (EM-off) scale factor that represents the duty-cycled emission of each pixel line of the display panel may be calculated by image processing circuitry of the electronic device based on the transient behavior of an emission profile of the display pixels. The EM-off scale factor may be calculated for different pixel lines on the display panel for various gray levels and various brightness levels of the display panel. The calculated EM-off scale factors may be stored in local memory of the electronic device. An EM-off scale factor for a certain brightness and gray level may be generated by interpolating corresponding calculated EM-off factor values. The EM-off scale factor may be used to compensate the measurement of the ALS.

With the preceding in mind and to help illustrate, an electronic device 10 including an electronic display 12 is shown in FIG. 1. As is described in more detail below, the electronic device 10 may be any suitable electronic device, such as a computer, a mobile phone, a portable media device, a tablet, a television, a wearable device such as a watch, an augmented reality or virtual reality or mixed reality headset and/or augmented reality glasses, a vehicle dashboard, or the like. Thus, it should be noted that FIG. 1 is one example of a particular implementation and is intended to illustrate the types of components that may be present in an electronic device 10.

The electronic device 10 includes the electronic display 12, image processing circuitry 11, one or more input devices 14, one or more input/output (I/O) ports 16, a processor core complex 18 having one or more processing circuitry(s) or processing circuitry cores, local memory 20, a main memory storage device 22, a network interface 24, a power source 26 (e.g., power supply). The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected to one of the I/O ports 16, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, a touch sensing, or the like. The input device 14 may include touch-sensing components (e.g., touch control circuitry, touch sensing circuitry) in the electronic display 12. The touch sensing components may receive user inputs by detecting occurrence or position of an object touching the surface of the electronic display 12.

In addition to enabling user inputs, the electronic display 12 may include a display panel with one or more display pixels. For example, the electronic display 12 may include a self-emissive pixel array having an array of one or more of self-emissive pixels or liquid crystal pixels. The electronic display 12 may include any suitable circuitry (e.g., display driver circuitry) to drive the self-emissive pixels, including for example row driver and/or column drivers (e.g., display drivers). Each of the self-emissive pixels may include any suitable light emitting element, such as an LED (e.g., an organic light-emitting diode (OLED) or a micro-LED). However, any other suitable type of pixel may also be used. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on an active area of the display panel. The display pixels may represent sub-pixels that each control a luminance value of one color component (e.g., red, green, or blue for an RGB pixel arrangement or red, green, blue, or white for an RGBW arrangement).

The electronic display 12 may display an image by controlling pulse emission (e.g., light emission) from its display pixels based on pixel or image data associated with corresponding image pixels (e.g., points) in the image. Before being used to display a corresponding image on the electronic display 12, the image data may be processed via the image processing circuitry 11. The image processing circuitry 11 may process the image data for display on one or more electronic displays 12. For example, the image processing circuitry 11 may include a display pipeline, memory-to-memory scaler and rotator (MSR) circuitry, warp compensation circuitry, or additional hardware or software means for processing image data. The image data may be processed by the image processing circuitry 11 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry. The image data may be processed by the image processing circuitry 11 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry. The image processing circuitry 11 may be implemented in the electronic device 10, in the electronic display 12, or a combination thereof. For example, the image processing circuitry 11 may be included in the processor core complex 18, a timing controller (TCON) in the electronic display 12, or any combination thereof.

In some embodiments, pixel or image data may be generated by an image source (e.g., image data, digital code), such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 12 may display an image frame of content based on pixel or image data generated by the processor core complex 18, or the electronic display 12 may display frames based on pixel or image data received via the network interface 24, an input device, or an I/O port 16.

The electronic display 12 may include an ALS 29, which may be placed beneath an active area of the electronic display 12. An ambient light signal may be transmitted through the active area and received by the ALS 29. The amount of on-axis optical transmission through the active area may be attributed to at least two factors, the "open-ratio" of the active area, which is the area fraction of the open areas (free from light-attenuating matters, such as routing traces) to the active area, and the transmission of the open areas. For example, when the "open-ratio" is greater, the area fraction of the open areas to the active area is bigger. In addition, the active area may include multiple layers, such as a cover glass layer, a polarizer layer, an encapsulation layer, and an OLED layer, which may include multiple OLEDs (e.g., a Red OLED, a Green OLED, a Blue OLED, or a white OLED). The front-emitted light of the OLEDs in the electronic display 12 may be reflected back to the display from interfaces between two layers of the multiple layers of the active area. The reflections of front-emitted light of the OLEDs from the interfaces between two layers of the multiple layers of the active area and light emissions generated by other mechanisms beyond simple reflections (e.g., emissions from outside of the OLED cavities) may contribute to a back-emission directed towards the back of the display. For example, an OLED may emit a front-emitted light signal, which may be reflected by an interface between the encapsulation layer and the polarizer layer. The reflected light signal may transmit back to the electronic display 12 and be received by the ALS 29. Accordingly, the ALS 29 may receive the transmitted signal of the ambient light signal and signals from the back-emission. In addition, reflection signals and scattering signals may interfere with the ambient light signal to be sensed by the ALS 29. That is, other signals of the display device may crosstalk with the ambient signal, resulting in an erroneous or inaccurate sensor reading. To compensate for these extraneous signals, the electronic device 10 may account for light emitted by the display pixels of the electronic display 12, including residual emission occurring after certain display pixels are no longer in an emission period.

Figure 2:
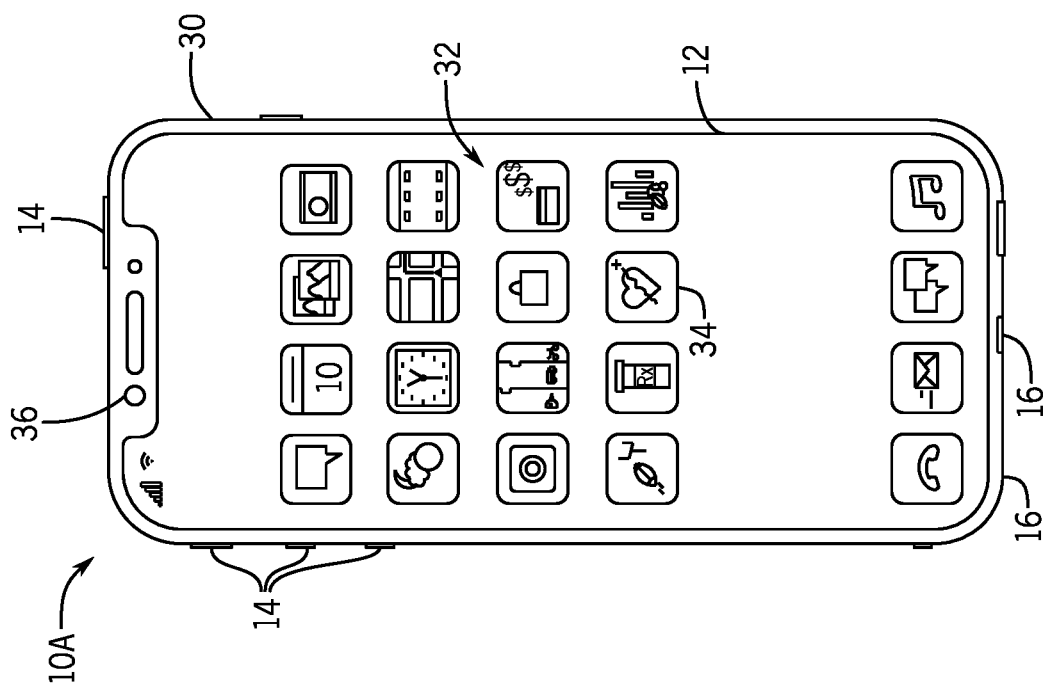
FIG. 2 is a perspective view of a notebook computer representing an embodiment of the electronic device of FIG. 1.

The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smart phone, such as any IPHONE® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch. The handheld device 10A includes one or more cameras 36 for capturing images.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
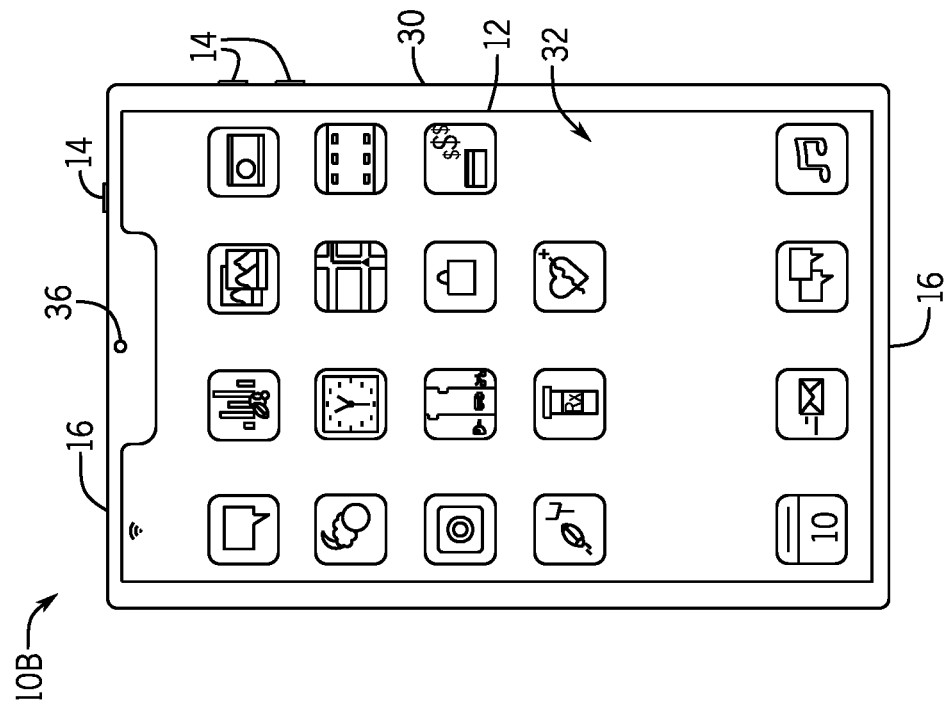
FIG. 3 is a front view of a handheld device representing another embodiment of the electronic device of FIG. 1.
Figure 4:
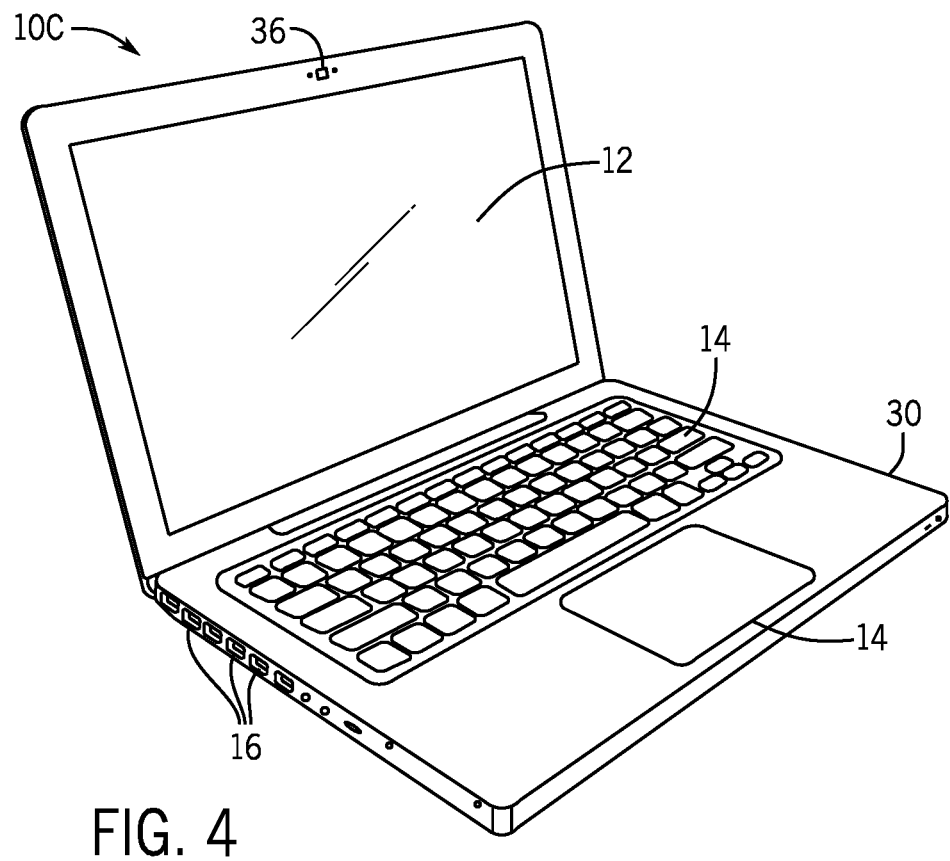
FIG. 4 is a front view of another handheld device representing another embodiment of the electronic device of FIG. 1.
Figure 5:
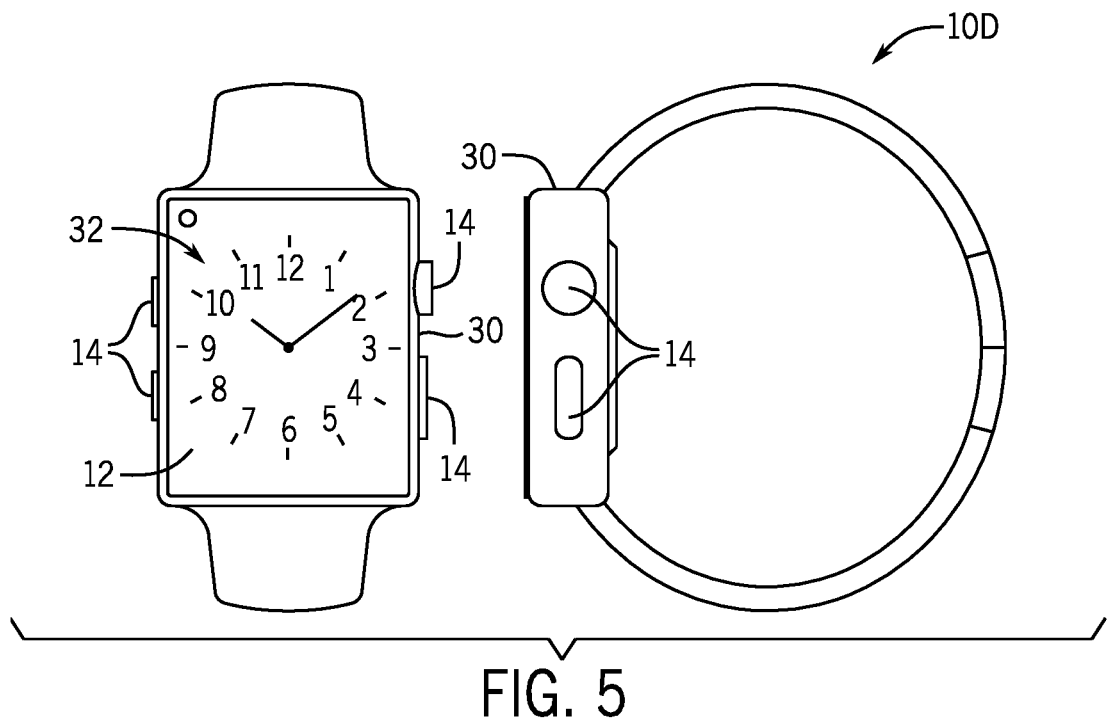
FIG. 5 is a front view and side view of a wearable electronic device representing another embodiment of the electronic device of FIG. 1.

Another example of a suitable electronic device 10, specifically a tablet device 10B, is shown in FIG. 3. The tablet device 10B may be any iPad® model available from Apple Inc. A further example of a suitable electronic device 10, specifically a computer 10C, is shown in FIG. 4. For illustrative purposes, the computer 10C may be any MacBook® or iMac® model available from Apple Inc. Another example of a suitable electronic device 10, specifically a wearable electronic device 10D, is shown in FIG. 5. For illustrative purposes, the wearable electronic device 10D may be any Apple Watch® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
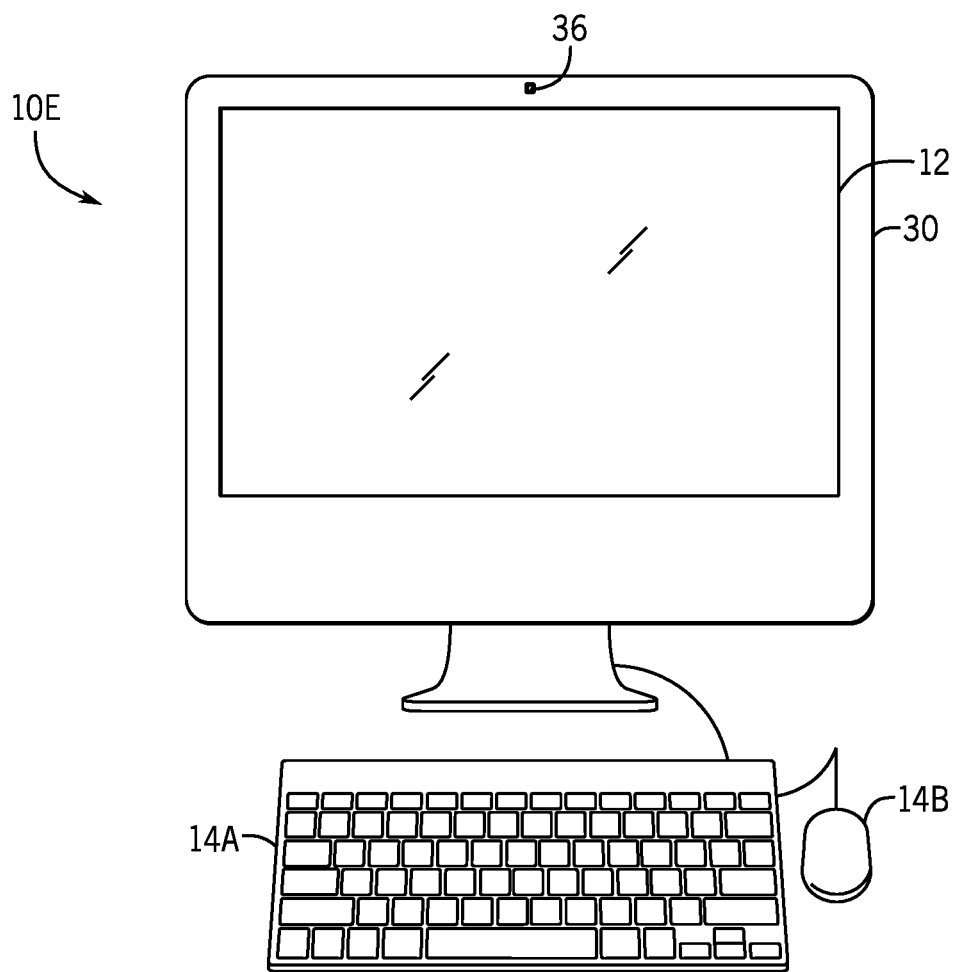
FIG. 6 is a front view of a desktop computer representing another embodiment of the electronic device of FIG. 1.

Turning to FIG. 6, a computer 10E may represent another embodiment of the electronic device 10 of FIG. 1. The computer 10E may be any computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 30 may be provided to protect and enclose internal components of the computer 10E, such as the electronic display 12. In certain embodiments, a user of the computer 10E may interact with the computer 10E using various peripheral input structures 14, such as the keyboard 14A or mouse 14B (e.g., input structures 14), which may connect to the computer 10E.

Figure 7:
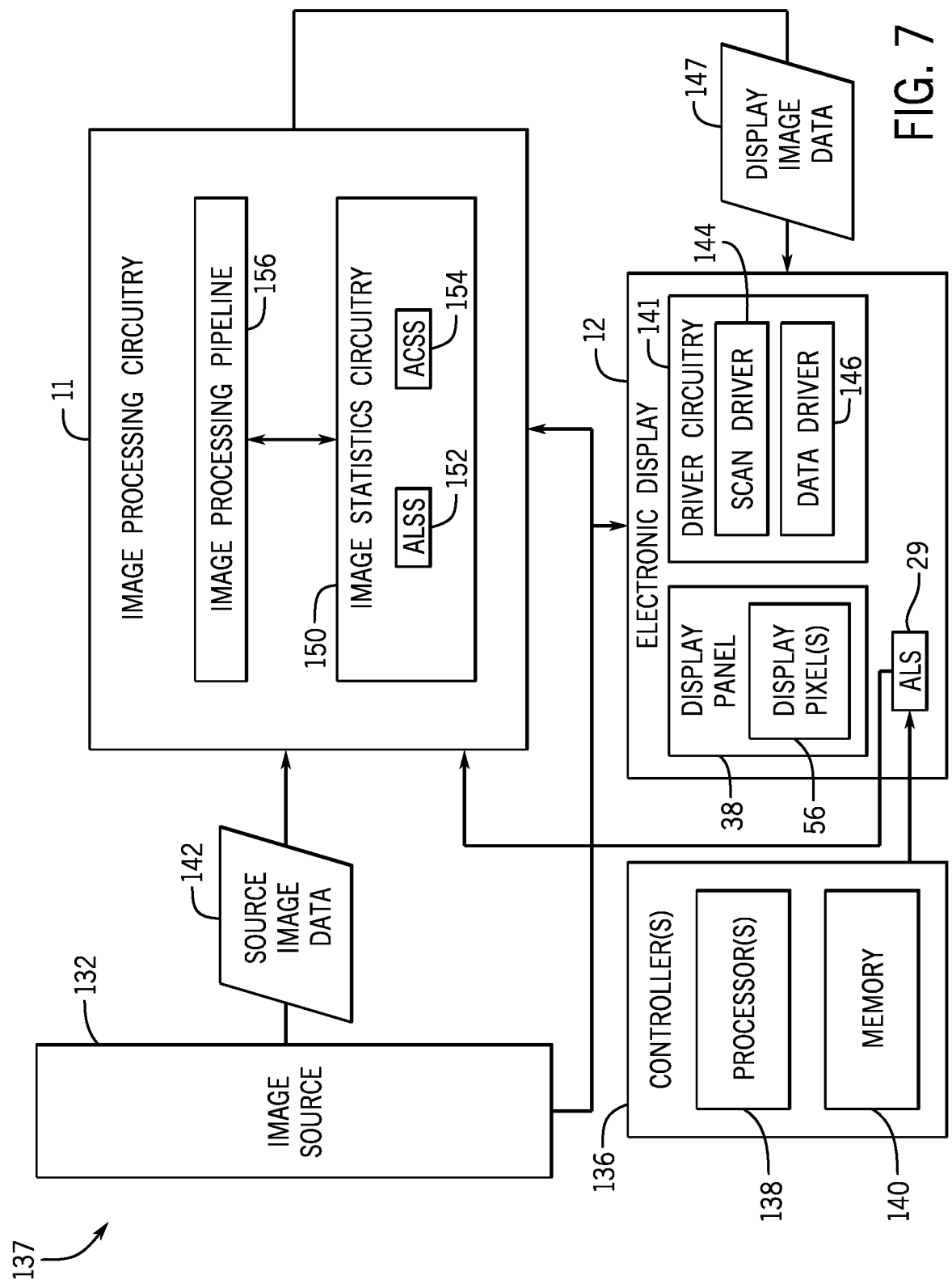
FIG. 7 is a block diagram of an example portion of the electronic device of FIG. 1 including an electronic display and image processing circuitry, according to embodiments of the present disclosure.

To help illustrate, a portion 137 of the electronic device 10, including image processing circuitry 11, is shown in FIG. 7. As should be appreciated, although image processing is discussed herein as being performed via a number of image data processing blocks, embodiments may include hardware (e.g., circuitry) or software components to carry out the techniques discussed herein. The electronic device 10 may include an image source 132, a display panel 38, one or more ambient light sensors (ALS) 29, and/or a controller 136 in communication with the image processing circuitry 11. In some embodiments, the display panel 38 of the electronic display 12 may be a reflective technology display, a liquid crystal display (LCD), or any other suitable type of display panel. In some embodiments, the controller 136 may control operation of the image processing circuitry 11, the electronic display 12, the one or more ALSs 29, the image source 132, or any combination thereof. Although depicted as a single controller 136, in other embodiments, one or more separate controllers 136 may be used to control operation of the image source 132, the image processing circuitry 11, the electronic display 12, the one or more ALSs 29, or any combination thereof.

To control operation, the controller 136 may include one or more controller processors 138 and/or controller memory 140. In some embodiments, the controller processor 138 may be included in the processor core complex 18, the image processing circuitry 11, a timing controller (TCON) in the electronic display 12, a separate processing module, or any combination thereof and execute instructions stored in the controller memory 140. Additionally, in some embodiments, the controller memory 140 may be included in the local memory 20, the main memory storage device 22, a separate tangible, non-transitory, computer-readable medium, or any combination thereof.

Generally, the image source 132 may be implemented and/or operated to generate source (e.g., input or original) image data 142 corresponding with image content to be displayed on the display panel 38 of the electronic display 12. Thus, in some embodiments, the image source 132 may be included in the processor core complex 18, a graphics processing unit (GPU), an image sensor (e.g., camera), and/or the like. Additionally, in some embodiments, the source image data 142 may be stored in the electronic device 10 before supply to the image processing circuitry 11, for example, in main memory 20, a storage device 22, and/or a separate, tangible, non-transitory computer-readable medium.

As illustrated in FIG. 7, the display panel 38 of the electronic display 12 may include one or more display pixels 56, which each include one or more color component sub-pixels. For example, each display pixel 56 implemented on the display panel 38 may include a red sub-pixel, a blue sub-pixel, and a green sub-pixel. In some embodiments, one or more display pixels 56 on the display panel 38 may additionally or alternatively include a white sub-pixel. The electronic display 12 may display image content on its display panel 38 by appropriately controlling light emission from display pixels (e.g., color component sub-pixels) 56 implemented thereon. Generally, light emission from a display pixel (e.g., color component sub-pixel) 56 may vary with the magnitude of electrical energy stored therein. For example, in some instances, a display pixel 56 may include a light-emissive element, such as an organic light-emitting diode (OLED), that varies its light emission with current flow there through, a current control switching device (e.g., transistor) coupled between the light-emissive element and a pixel power (e.g., VDD) supply rail, and a storage capacitor coupled to a control (e.g., gate) terminal of the current control switching device. As such, varying the amount of energy stored in the storage capacitor may vary voltage applied to the control terminal of the current control switching device and, thus, magnitude of electrical current supplied from the pixel power supply rail to the light-emissive element of the display pixel 56.

However, it should be appreciated that discussion with regard to OLED examples are intended to be illustrative and not limiting. In other words, the techniques described in the present disclosure may be applied to and/or adapted for other types of electronic displays 12, such as a liquid crystal display (LCD) 12 and/or a micro light-emitting diode (LED) electronic displays 12. In any case, since light emission from a display pixel 56 generally varies with electrical energy storage therein, to display an image, an electronic display 12 may write a display pixel 56 at least in part by supplying an analog electrical (e.g., voltage and/or current) signal to the display pixel 56, for example, to charge and/or discharge a storage capacitor in the display pixel 56.

To selectively write its display pixels 56, as in the depicted example, the electronic display 12 may include driver circuitry 141, which includes a scan driver 144 and a data driver 146. In particular, the electronic display 12 may be implemented such that each of its display pixels 56 is coupled to the scan driver 144 via a corresponding scan line and to the data driver 146 via a corresponding data line. Thus, to write a row of display pixels 56, the scan driver 144 may output an activation (e.g., logic high) control signal to a corresponding scan line that causes each display pixel 56 coupled to the scan line to electrically couple its storage capacitor to a corresponding data line. Additionally, the data driver 146 may output an analog electrical signal to each data line coupled to an activated display pixel 56 to control the amount of electrical energy stored in the display pixel 56 and, thus, control the resulting light emission (e.g., perceived luminance and/or perceived brightness).

As described above, image data corresponding with image content be indicative of target visual characteristics (e.g., luminance and/or color) at one or more specific points (e.g., image pixels) in the image content, for example, by indicating color component brightness (e.g., grayscale) levels that are scaled by a panel brightness setting. In other words, the image data may correspond with a pixel position on a display panel and, thus, indicate target luminance of at least a display pixel 56 implemented at the pixel position. For example, the image data may include red component image data indicative of target luminance of a red sub-pixel in the display pixel 56, blue component image data indicative of target luminance of a blue sub-pixel in the display pixel 56, green component image data indicative of target luminance of a green sub-pixel in the display pixel 56, white component image data indicative of target luminance of a white sub-pixel in the display pixel 56, or any combination thereof. As such, to display image content, the electronic display 12 may control supply (e.g., magnitude and/or duration) of electrical signals from its data driver 146 to its display pixels 56 based at least in part on corresponding image data.

To improve perceived image quality, image processing circuitry 11 may be implemented and/or operated to process (e.g., adjust) image data before the image data is used to display a corresponding image on the electronic display 12. Thus, in some embodiments, the image processing circuitry 11 may be included in the processor core complex 18, a display pipeline (e.g., chip or integrated circuit device), a timing controller (TCON) in the electronic display 12, or any combination thereof. Additionally or alternatively, the image processing circuitry 11 may be implemented as a system-on-chip (SoC).

As in the depicted example, the image processing circuitry 11 may be implemented and/or operated to process the source image data 142 output from the image source 132. In some embodiments, the image processing circuitry 11 may directly receive the source image data 142 from the image source 132. Additionally or alternatively, the source image data 142 output from the image source 132 may be stored in a tangible, non-transitory, computer-readable medium, such as main memory 20, and, thus, the image processing circuitry 11 may receive (e.g., retrieve) the source image data 142 from the tangible, non-transitory, computer-readable medium, for example, via a direct memory access (DMA) technique. The image processing circuitry 11 may then process the source image data 142 to generate display (e.g., processed or output) image data 147, for example, which adjusts target luminance to compensate for expected optical crosstalk and, thus, the resulting color shift.

Figure 11:
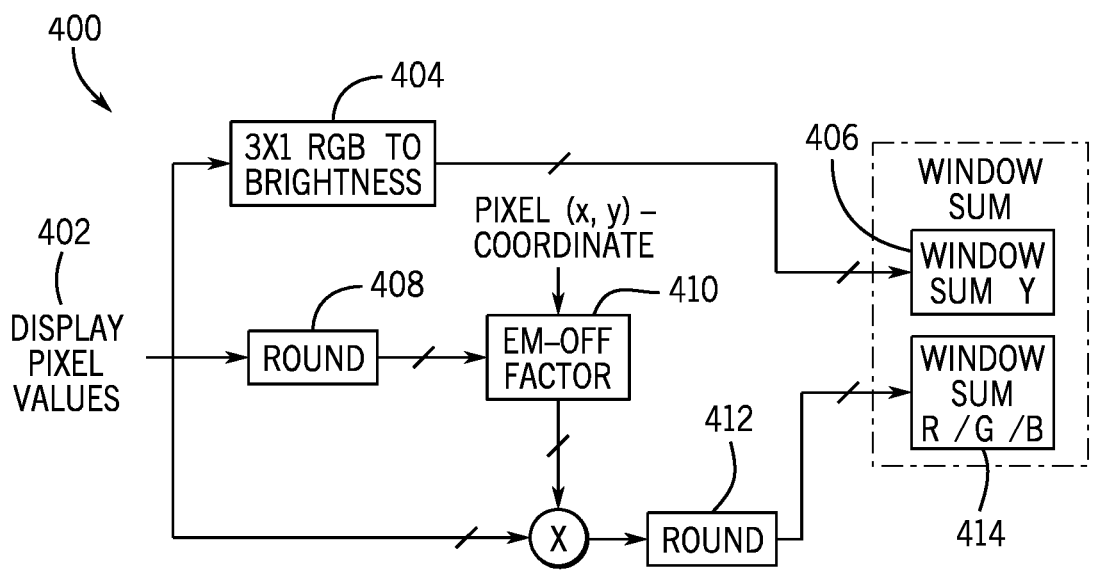
FIG. 11 is a block diagram illustrating a process of the Ambient Light Sensor Statistics (ALSS) circuitry, according to embodiments of the present disclosure.

The image processing circuitry 11 may include image statistics circuitry 150, which may include ambient light luminance sensing statistics (ALSS) circuitry 152 and ambient light color sensing statistics (ACSS) circuitry 154. In some applications, ambient light luminance sensor measurements may need to be compensated for display pixel 56 values. The ALSS circuitry 152 may be used to provide data about average color and brightness of display pixels 56 in multiple configurable windows (e.g., 64 configurable windows) in the display content to help calculate the compensation for the ambient light luminance sensor measurements. Color and brightness components values may be collected from the pixel values of the display content before any content modification and/or any panel specific compensation, or after all linear domain panel specific compensation. A block diagram of the ALSS circuitry 154 is illustrated in FIG. 11. In some applications, ambient light color sensor measurements may need to be compensated for display pixel values. The ACSS circuitry 154 may be used to calculate the compensation for the ambient light color sensor measurements. The ACSS circuitry 154 may provide weighted color component values in multiple regions of a display and for multiple response channels of ALS 29 ambient light color sensing to help in compensation of the sensor measurements for display pixel 56 values.

The image processing circuitry 11 may also include an image processing pipeline 156 in communication with the image statistics circuitry 150. The image processing pipeline 156 may be used for preparing the source image data 142 to be displayed on the display panel 38, and the image processing pipeline 156 may use one or more processing circuitry.

Figure 8:
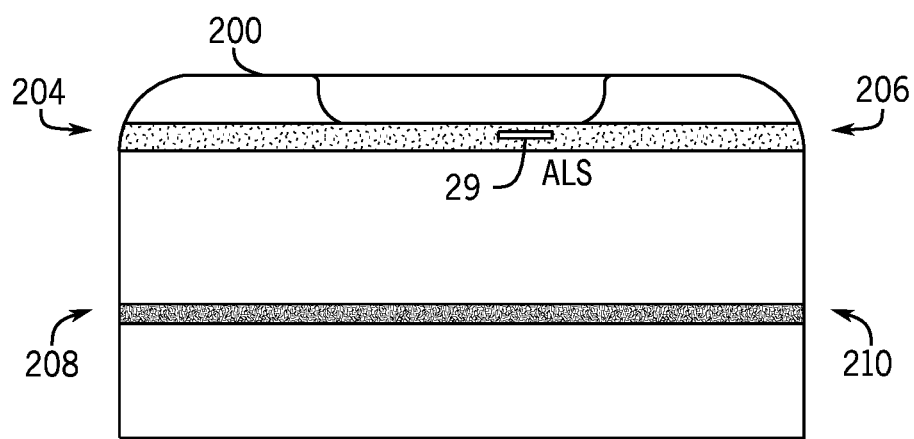
FIG. 8 is a schematic diagram illustrating emission masks on a portion of a display panel, according to embodiments of the present disclosure.
Figure 9:
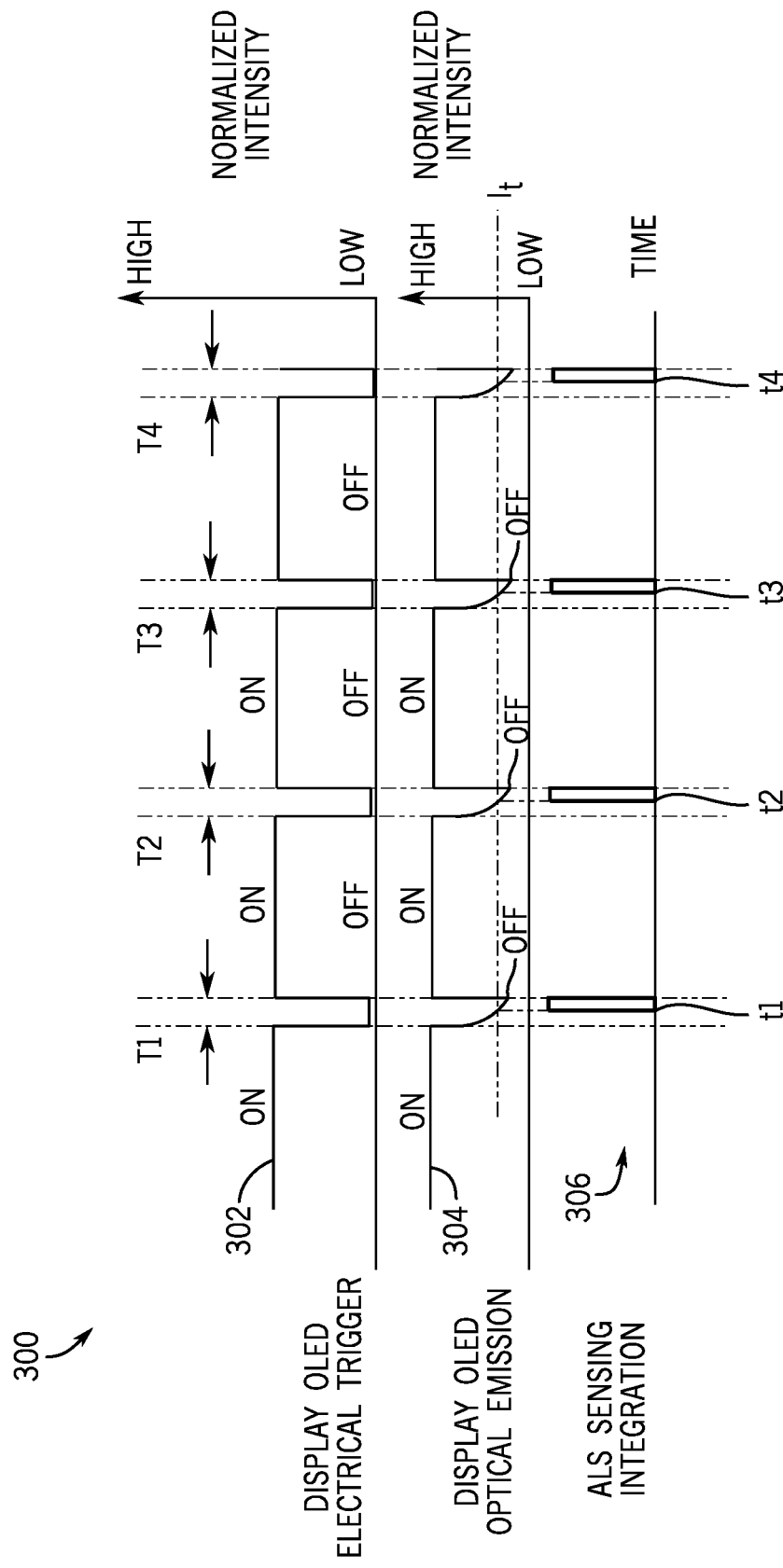
FIG. 9 is a timing diagram of an embodiment implementing ambient light sensor sensing during emission blanking periods, according to embodiments of the present disclosure.

As previously mentioned, the ALS 29 may be placed beneath an active area of the electronic display 12, as illustrated in FIG. 8. To reduce (e.g., minimize) the back-emission induced crosstalk, the ALS 29 may be designed to be capable of fast sensing within short time period windows (e.g., less than an emission blanking period of a display pixel). With the ALS 29 capable of fast sensing (e.g., less than an emission blanking period of a display pixel), the ALS 29 integration period may be synchronized to emission blank periods of the display pixel line, as illustrated in FIG. 8 and FIG. 9. Yet even when sensing takes place during an emission blank period, there may be some residual light emission from the display pixels 56. The residual light emission may be accounted for and used for compensation of the ambient light signals from the ALS 29.

Figure 10:
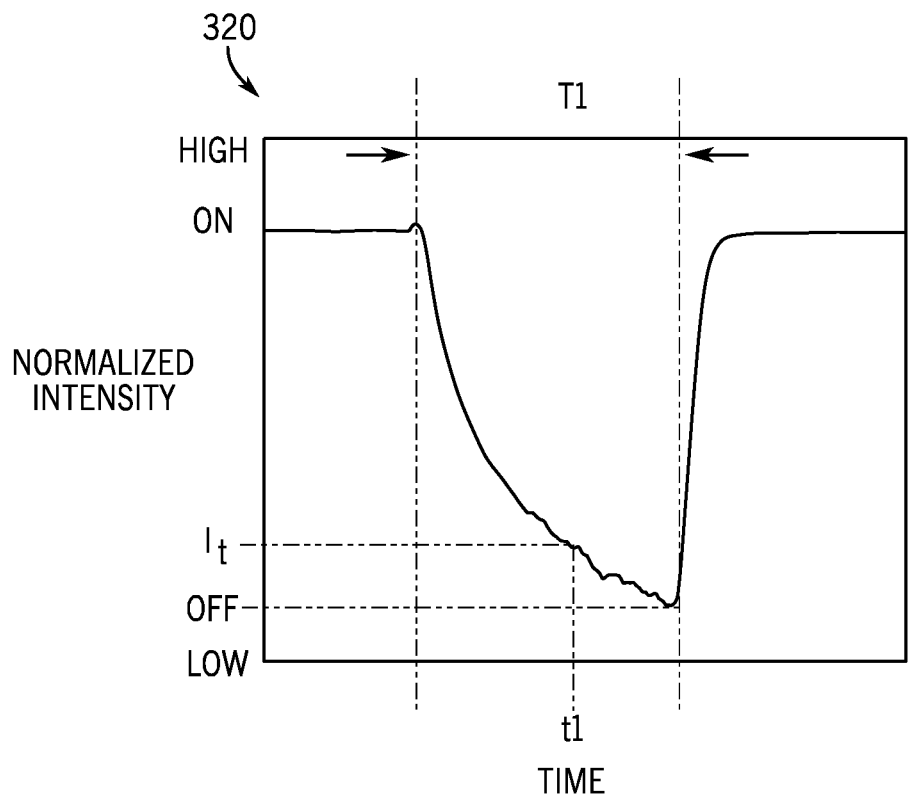
FIG. 10 is a timing diagram illustrating transient behavior of an LED, according to embodiments of the present disclosure.

FIG. 8 is a schematic diagram illustrating emission masks on a portion 200 of the display panel 38. The ALS 29 may be located beneath a display pixel line 204 on the portion 200 of the display panel 38. The ALS 29 integration period may be synchronized to emission blanking periods of the display pixel line 204. That is, the ALS 29 integration may occur when the display pixel line 204 is covered by an emission mask 206. Due to the intrinsic emission-off transient behavior of the OLED, the emission of the display pixel line 204 may decay for a period of time during the emission blanking periods, which may result in nonzero emission mask amplitudes during the emission blanking periods, as illustrated in FIG. 10. The emission mask amplitude may depend on the OLED transient behavior, the brightness of the display, image content displayed on the display, and the emission-off duty cycle. For example, the emission mask 206 may be generally narrowest when the display is brightest and the duty cycle is highest. On the portion 200 of the display, another display pixel line 208 may have a minimum gray level value on a corresponding gray band of an emission mask 210 for a display pixel line 208.

FIG. 9 illustrates a timing diagram 300 of an embodiment implementing ALS sensing during emission blanking periods. In FIG. 9, a display OLED electrical trigger signal 302 may be used to control (e.g., turn on/turn off) optical emission 304 of a display OLED. The ALS sensing integration 306 may be synchronized to the display OLED emission blanking periods, such as blanking periods T1, T2, T3 and T4 illustrated in FIG. 9. Thus, the ALS sensing integration occurs during the blanking periods, such as during the T1, T2, T3, and T4 periods. During the blanking periods (e.g., T1, T2, T3, T4), the display OLED electrical trigger signal 302 is turned off, which may turn off the power supply to the display OLED. The display OLED optical emission may have an intrinsic emission-off transient behavior and may decay for a period of time before being completely off, as shown in FIG. 10. Thus, during the blanking periods, the display OLED optical emission is not completely off. To reduce the effect of the display emission crosstalk, the ALS sensing integration 306 may start sensing integration at a certain time after the blanking periods start when the display OLED optical emission 304 is not more than a threshold value $I_t$. For example, during the blanking periods T1 T2, T3, and T4, the ALS sensing integration may start at corresponding time t1, t2, t3, and t4, respectively, when the display OLED optical emission 304 is not more than the threshold value $I_t$. The ALS sensing integration may end any time before or at corresponding end of each blanking period (e.g., T1, T2, T3, and T4).

FIG. 10 shows a portion 320 of the display OLED optical emission 304, which illustrates the blanking period T1 and the corresponding start time t1 for the ALS sensing integration during the blanking period T1. As shown in FIG. 10, the ALS sensing integration may start at any time after time t1 or at time t1, when the display OLED optical emission 304 is not more than the threshold value $I_t$. The ALS sensing integration may end any time before or at the end of the blanking period T1.

Implementing ALS sensing integration during the blanking periods of the OLED display emission may reduce the amount of display back-emission observed by the ALS substantially and thus reduce the display crosstalk. In addition, the fast sensing integration may accommodate the rapidly changing, dynamic image content displayed on the display. Additionally or alternatively to the ALS sensing during emission blanking periods, a per-frame content-based crosstalk estimation scheme may be used to compensate for the display crosstalk. Additionally, OLED displays may be driven line by line. Accordingly, different pixel lines may have different average back-emission amplitude during the ALS integration period. As such, the ALS sensor may sense a gray band "emission mask" representing the average amount of time that light emission of a particular line of pixels is on during the ALS integration period, as illustrated in FIG. 8. Thus, the gray levels in the gray band of the "emission mask" may correspond to average amount of time that light emission of a particular line of pixels is on during the ALS integration period. For example, the minimum gray level of the gray band may correspond to the minimum average amount of time that light emission of a particular line of pixels is on during the ALS integration period, and the maximum gray level of the gray band may correspond to the maximum average amount of time that light emission of a particular line of pixels is on during the ALS integration period.

Figure 12:
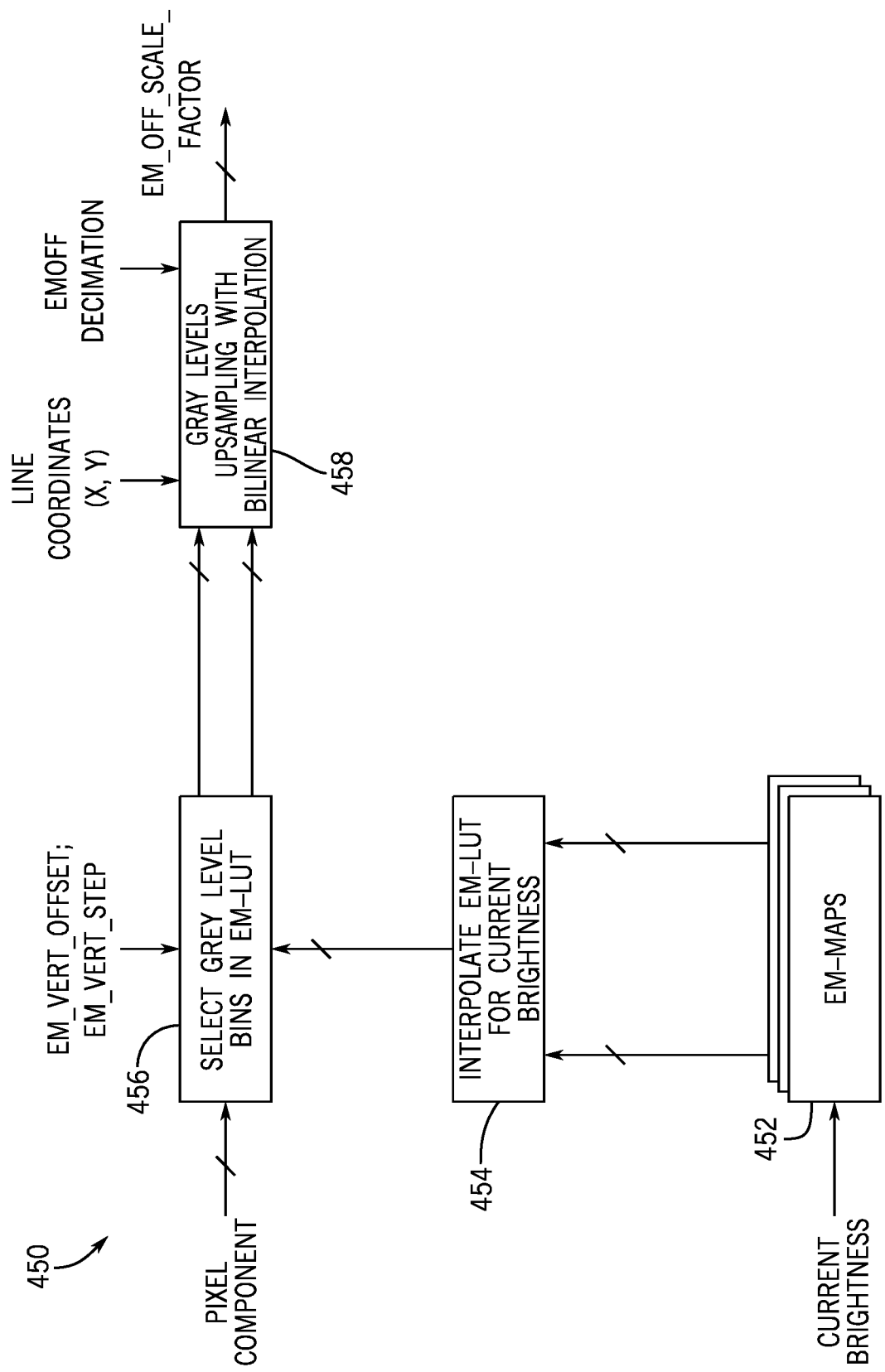
FIG. 12 is a block diagram illustrating a process of an emission-off factor block, according to embodiments of the present disclosure.
Figure 13:
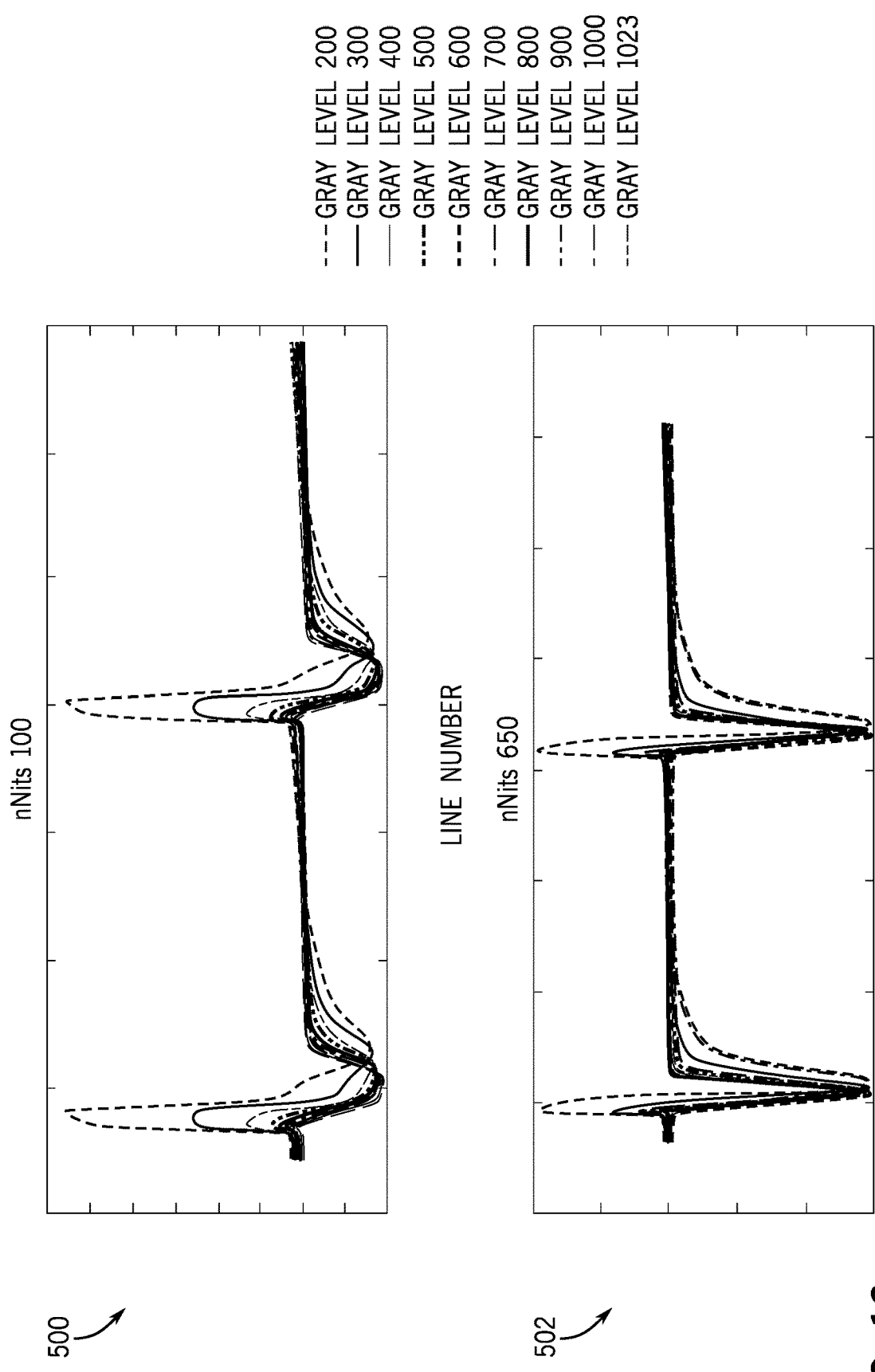
FIG. 13 shows gray level dependency of the emission-off band, according to embodiments of the present disclosure.
Figure 14:
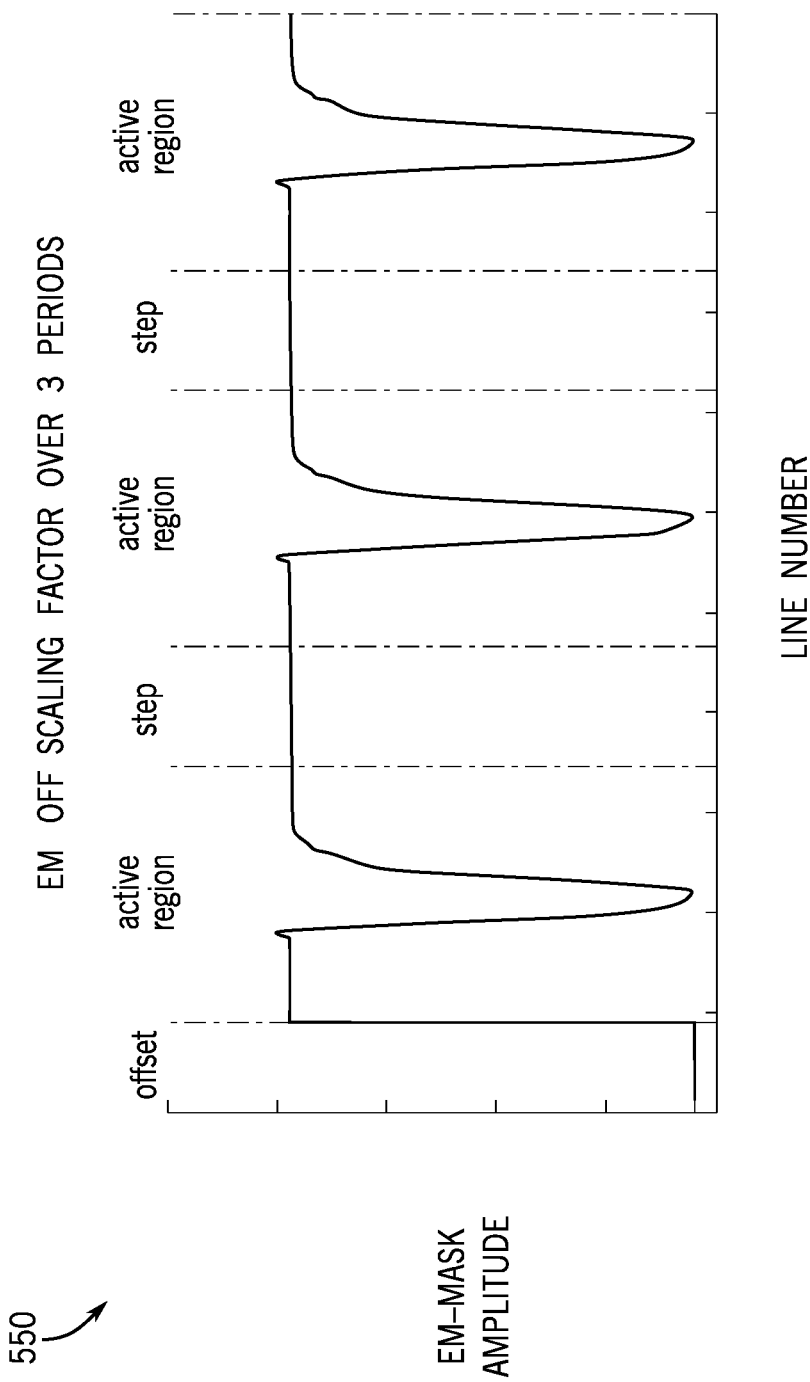
FIG. 14 is a plot illustrating emission-off scale factors for active regions on a display panel, according to embodiments of the present disclosure.

Moreover, the OLED transient behavior, as illustrated in FIG. 10, may impact the amount of crosstalk that the ALS receives during integration time, thus is an important input to the crosstalk estimation. Accordingly, an emission-off (EM-off) scale factor may be calculated for different pixel lines on the display panel 38 based on the OLED transient behavior for various gray levels and various brightness levels of the display panel 38. An EM-off scale factor for a certain brightness and gray level may be generated by interpolating calculated EM-off scale factor values, as illustrated in FIGS. 12-14. The calculated EM-off scale factor values may be stored in emission-off scale factor lookup tables (EM-LUTs).

In addition, the amount of display back-emission observed by the ALS is related to the brightness of the display pixels in the vicinity of the ALS and the optical coupling of the display pixels in the vicinity of the ALS to the ALS. A display crosstalk "heat map" may be used to describe the optical coupling of each display pixel to the ALS. A respective crosstalk potential from each display pixel to the ALS 29 may be determined by multiplying the crosstalk heat map and the gray band of the "emission mask" of the ALS. The respective crosstalk potential may be multiplied by the display content on a per-frame basis, and the result may be summed over all display pixels in a vicinity of the ALS 29 to obtain an estimated optical crosstalk over the vicinity of the ALS. The process may be repeated for each display primary emissions (e.g., red, green, blue) and to obtain a total estimated optical crosstalk. The total estimated optical crosstalk may be subtracted from the sensing measurement of the ALS. The calculation of the total estimated optical crosstalk may be done in real-time as part of the display image processing flow. The content-based crosstalk estimation and compensation may achieve high sensing efficiency for the ALS and reduce the impact of display crosstalk substantially. To ensure privacy of the display content, the calculation of the display content-based crosstalk may be isolated within the hardware of the secure display pipeline inside the processor core complex 18. The estimate of the display content-based crosstalk may be aggregated on-the-fly by combining the content in a non-separable manner with the emission mask and the heat map. Only the final total estimated optical crosstalk may be available for adjustments of the ALS sensor reading, and no memory of the display content may be maintained.

FIG. 11 depicts a block diagram illustrating a process 400 of the Ambient Light Luminance Sensing (ALSS) statistics circuitry 152. The process 400 may be used to provide data about average color and brightness of display pixels in multiple configurable windows (e.g., 64 configurable windows) in the display content to help calculate the compensation of the sensor measurements for display pixel values 402. The display pixel values 402 may include color and brightness components values collected from the pixel values of the display content. In a converter block 404, the color components (e.g., red (R), green (G), blue (B)) values may be converted to respective brightness values, which may be accumulated over the enabled configurable windows. For example, RGB components values of the display pixels may be converted to a converted brightness value Y by multiplying R, G, and B components values by a gain factor and summing the gained values in the converter block 404. The converted brightness value Y is output from the converter 404 and may be normalized before summing over the enabled configurable windows in a window sum block 406 to obtain the accumulated brightness values.

In addition, to support integration of the measurements of the ambient light luminance sensor only during the rolling emission-off bands in the display, an EM-off scale factor that represents the duty-cycled emission of each line of the display may be calculated by an EM-off factor block 410. The color components (e.g., red (R), green (G), blue (B)) values of the display pixel values 402 may be rounded at a block 408 and normalized before inputting into the EM-off factor block 410 to obtain EM-off scale factors, which may represent the gray band of the "emission mask" when considering duty-cycled emission of each pixel line of the display due to the intrinsic emission-off transient behavior of the OLED. The EM-off scale factor may be gray level dependent and bright ness level dependent, and the EM-off factor block 410 may generate the EM-off factor by interpolating calculated EM-off scale factor values stored in the associated EM-LUTs, as described in detail in FIG. 12. The EM-off scale factor may be applied as a weight to each heat map region to calculate the crosstalk potentials from each display pixel to the ALS 29, as described above. The output of the EM-off factor block 410 may be multiplied by the color components (e.g., red (R), green (G), blue (B)) values of the display pixel values 402 to obtain the brightness values, which may be rounded at a block 412. The output of the block 412 may be normalized before inputting into a window sum block 414 to sum over the enabled configurable windows to obtain an accumulated brightness values. The accumulated converted brightness values of the display pixel over the enabled configurable windows and the accumulated brightness values of the display content may be used to calculate the compensation for ambient light luminance sensor measurements. As should be appreciated, although image processing is discussed herein as being performed via a number of image data processing blocks (e.g., block 404, 406, 408, 410, 412, 414), embodiments may include hardware (e.g., circuitry) or software components to carry out the techniques discussed herein. In addition, although the process 400 is illustrated for the ALSS circuitry 152 in FIG. 11, the EM-off scale factor may also be calculated similarly for the ambient light color sensing statistics (ACSS) circuitry 154.

FIG. 12 depicts a block diagram illustrating a process 450 of the EM-off factor block 410. At block 452, a pair of emission lookup tables (EM-LUT) (e.g., EM-LUT[0:M][0:N][1] and EM-LUT[0:M][0:N][0], M, N=1, 2, . . . ) that are defined for the brightness interval containing the current brightness value may be selected. The EM-LUT contains calculated EM-off scale factors for corresponding brightness values and gray levels. For example, the EM-LUT[0:M][0:N][1] (e.g., [1] represents a first brightness value, [0:N] represents N gray levels, and [0:M] represents M number of values for the EM-off factor) corresponds to a set of EM-LUTs for the first brightness value while the EM-LUT[0:M][0:N][0] (e.g., [0] represents a second brightness value, [0:N] represents N gray levels, and [0:M] represents M number of values for the EM-off factor) corresponds to a set of EM-LUTs for the second brightness value, and the current brightness value is in between the first brightness value and the second brightness value.

At block 454, the selected pair of EM-LUTs may be used to interpolate the EM-LUT for the current brightness. The interpolated EM-LUT (e.g., EM-LUT[0:M][0:N]) for the current brightness may be input into block 456 to select a pair of rows in the interpolated EM-LUT (e.g., EM-LUT[0:M][0:N]) with corresponding gray levels to cover the gray level of the pixel component input into the block 456. For example, the row corresponding to gray level k (e.g., EM-LUT[0:M][k]) and the row corresponding to gray level k+1 (e.g., EM-LUT[0:M][k+1]) may be selected. An offset (e.g., EM_vert_offset) may be used in block 456 to specify the starting line, and a step (e.g., EM_vert_step) may be used in block 456 to specify the number of lines between repeated active regions, as illustrated in FIG. 14.

The pair of selected rows may be input into block 458 to interpolate (e.g., bilinear interpolation) EM-off scale factor for the gray level of the pixel component input into the block 456. Line coordinates (e.g., (x, y)) may be used in block 458 to determine the EM-off scale factor, and a parameter (e.g., EmOffDecimation[0:1]) may be used to determine the resampling ratios. For example, when the parameter has a value of 0, the maximum EM-off scale factor may be 64, and when the parameter has a value of 1, the maximum EM-off scale factor may be 128.

FIG. 13 depicts a plot 500 illustrating gray level dependency of the emission-off band at a first brightness level (e.g., nits level 100) and a plot 502 illustrating gray level dependency of the emission-off band at a second brightness level (e.g., nits level 650).

FIG. 14 depicts a plot 550 illustrating EM-off scale factors over three active regions (3 periods). In FIG. 14, the emission masks are applied during the emission-off period and started at line coordinates specified by an offset (e.g., EM_vert_offset). Each active region may cover multiple consecutive lines (e.g., 256 lines) and may be repeated over several vertical regions (e.g., 255 vertical regions). The number of lines between repeated active regions is specified by a step (e.g., EM_vert_step).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112 (f). However, for any claims containing elements designated in any other manner, it is intended that such elements are not to be interpreted under 35 U.S.C. 112(f).

What is claimed is:

1. A method comprising:
    operating an ambient light sensor of an electronic display to sense light signals during an integration period occurring after a time offset within an emission blanking period of a region of display pixels of the electronic display when emission from the region of display pixels of the electronic display is less than a threshold luminance value;
    generating an emission-off scale factor for a display pixel of the electronic display at least in part based on a brightness level of the electronic display and a gray level of display content displayed at the display pixel, wherein the emission-off scale factor is indicative of an amount of light emission of the display pixel during the integration period of the ambient light sensor;
    calculating a crosstalk compensation for the ambient light sensor using the emission-off scale factor; and applying the crosstalk compensation to a reading of the ambient light sensor.

2. The method of claim 1, wherein the emission-off scale factor is generated for the brightness level by interpolating a plurality of calculated emission-off scale factor values.

3. The method of claim 2, wherein the emission-off scale factor is generated for the gray level by interpolating the plurality of calculated emission-off scale factor values.

4. The method of claim 2, wherein the plurality of calculated emission-off scale factor values are generated based on an emission profile of the region of display pixels when the region of display pixels is turned off.

5. The method of claim 4, wherein the plurality of calculated emission-off scale factor values are generated for one or more brightness levels of the electronic display.

6. The method of claim 4, wherein the plurality of calculated emission-off scale factor values are generated for one or more gray levels of the electronic display.

7. The method of claim 4, wherein the region of display pixels comprises an organic light emitting diode.

8. An electronic device, comprising:
an ambient light sensor configured to detect measurements of ambient light for an electronic display coupled to the electronic device; and
circuitry configured to generate an emission-off scale factor, which is used to compensate the measurements of ambient light, by:
    selecting a plurality of emission lookup tables based on a current brightness of the electronic display, wherein the plurality of emission lookup tables correspond to respective brightnesses of the electronic display;
    interpolating the plurality of emission lookup tables to obtain an interpolated emission lookup table for the current brightness of the electronic display; and
    generating the emission-off scale factor using the interpolated emission lookup table, wherein generating the emission-off scale factor comprises:
        selecting a plurality of rows in the interpolated emission lookup table based on a gray level of the electronic display; and
        interpolating the plurality of rows to obtain the emission-off scale factor.

9. The electronic device of claim 8, wherein the plurality of emission lookup tables comprise a plurality of calculated emission-off scale factors obtained based on an emission profile of a display pixel of the electronic display when the display pixel is turned off.

10. The electronic device of claim 9, wherein the display pixel comprise an organic light emitting diode (OLED).

11. The electronic device of claim 9, wherein the plurality of calculated emission-off scale factors are generated for a plurality of brightness levels of the electronic display.

12. The electronic device of claim 9, wherein the plurality of calculated emission-off scale factors are generated for a plurality of gray levels of the electronic display.

13. The electronic device of claim 8, wherein the electronic device comprises a handheld device, a notebook computer, a mobile phone, a tablet, a wearable device, a desktop computer, or any combination thereof.

14. An electronic device comprising:
an active area of an electronic display;
an ambient light sensor configured to sense ambient light above the active area during an integration period occurring after a time offset within an emission blanking period of a region of display pixels of the electronic display when emission from the region of display pixels of the electronic display is less than a threshold luminance value; and
circuitry configured to:
    generate an emission-off scale factor for a display pixel of the electronic display at least in part based on a brightness level of the electronic display and a gray level of display content displayed at the display pixel, wherein the emission-off scale factor is indicative of an amount of light emission of the display pixel during the integration period of the ambient light sensor;
    calculate a crosstalk compensation for the ambient light sensor using the emission-off scale factor; and
    apply the crosstalk compensation to a reading of the ambient light sensor.

15. The electronic device of claim 14, wherein the ambient light sensor is located beneath the region of display pixels.

16. The electronic device of claim 14, wherein a first portion of display pixels of the electronic display are on and emitting light and a second portion of the display pixels of the electronic display are off and are emitting residual light after previously being on.

17. The electronic device of claim 16, wherein the ambient light sensor is configured to receive residual light emission from the second portion of the display pixels.

18. The electronic device of claim 17, wherein the residual light emission from the second portion of the display pixels are estimated based on an emission profile of the display pixels.

19. The electronic device of claim 18, wherein the emission profile is associated with a global brightness level of the electronic display.

20. The electronic device of claim 18, wherein the emission profile is associated with a gray level of display content displayed on the electronic display.

21. The electronic device of claim 18, wherein the display pixels comprise an organic light emitting diode (OLED).

* * * * *